J. E. POWELL.
COUPLING.
APPLICATION FILED DEC. 15, 1914.
1,185,435.
Patented May 30, 1916.
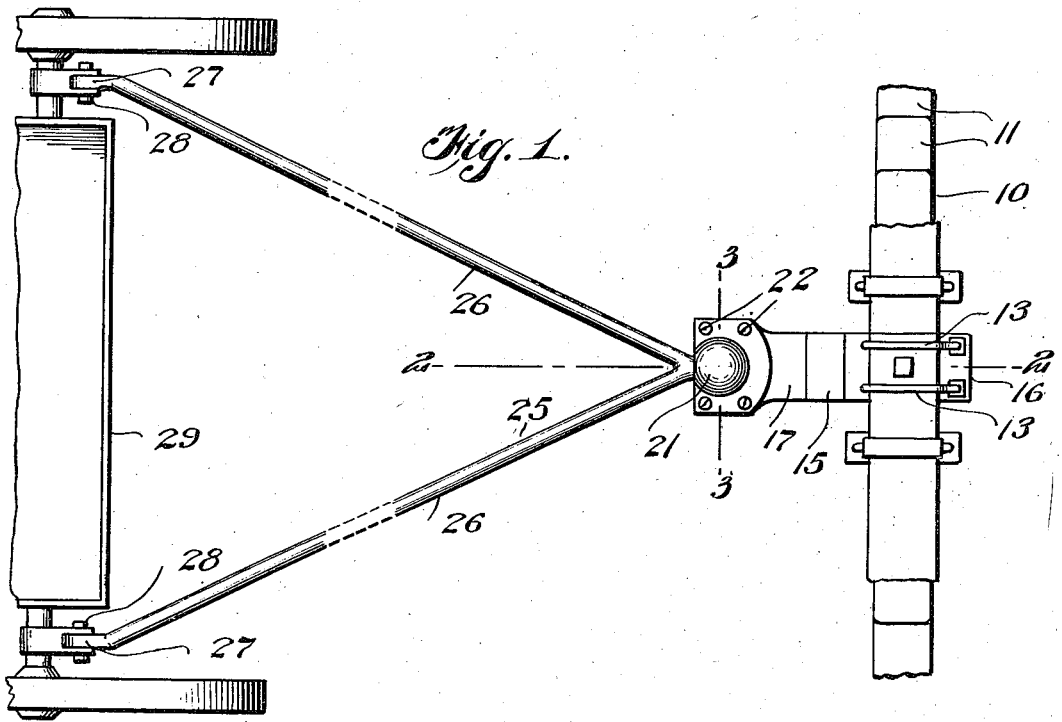
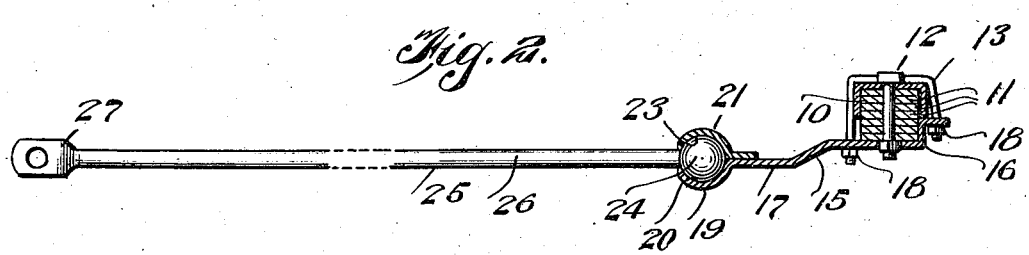
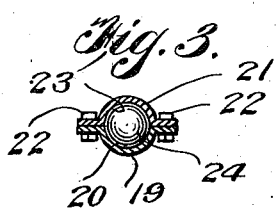
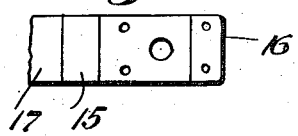
Witnesses
J. R. Heinrichs
A. A. Hoster
Inventor
Jesse E. Powell
By Victor J. Evans
Attorney

UNITED STATES PATENT OFFICE.

JESSE E. POWELL, OF SEBASTIAN, FLORIDA.

COUPLING.

1,185,435.  Specification of Letters Patent.  Patented May 30, 1916.

Application filed December 15, 1914. Serial No. 877,404.

*To all whom it may concern:*

Be it known that I, JESSE E. POWELL, a citizen of the United States, residing at Sebastian, in the county of St. Lucie and State of Florida, have invented new and useful Improvements in Couplings, of which the following is a specification.

An object of the invention is to provide a coupler, particularly adaptable for use in connection with automobiles for readily coupling a vehicle to an automobile and as readily uncoupling the same therefrom.

The invention contemplates, among other features, the provision of a coupler of a simple construction and consisting of few parts, the coupler being so designed and constructed as to insure an effective connection between a vehicle, such as a wagon, and an automobile, whereby the wagon can be readily connected to the rear of the automobile and be effectively drawn thereby over the ground.

In the further disclosure of the invention reference is to be had to the accompanying drawings, constituting a part of this specification, in which similar characters of reference denote coresponding parts in all the views, and in which:

Figure 1 is a fragmentary plan view of the coupler showing the same applied; Fig. 2 is a vertical sectional view taken on the line 2—2 in Fig. 1; and Fig. 3 is a vertical transverse sectional view taken on the line 3—3 in Fig. 1; Fig. 4 is a detail plan view of a portion of the plate.

Referring more particularly to the views, I disclose the usual rear spring 10 of an automobile and which has its various leaves 11 connected at their central portions by a transverse bolt 12. Partially encircling the spring 10 and extending transversely thereto are straps 13, the ends of said straps passing transversely through a rearwardly extending member 15 in the nature of a flat plate or bar and which has an inner offset portion 16 terminating in the apertured ear and an offset shank 17, the inner offset portion 16 being formed in order that the inner end of the member 15 will fit against the under side of the spring 10. The ends of the straps 13 are adapted to receive suitable nuts 18 to hold the ends of the strap in rigid engagement with the member 15.

The free end of the shank 17 of the member 15 is enlarged to form a head 19 having a substantially semi-circular depression or recess 20 and a plate 21 adapted for connection with the head by suitable screws or bolts 22, said plate 21 also having a semi-circular depression or recess 23 and which recesses 20 and 23 form a socket or seat for a ball-like head 24 formed at the forward end of and constituting a part of a V-shaped coupling member 25, the sides 26 of which are formed to converge at the ball-like head 24, with the free ends of the sides provided with enlarged portions 27 having openings therethrough to receive bolts 28 connecting with the thills of a vehicle 29.

In the use of the device described the member formed by the strap 13 and member 15 is rigidly secured to the spring 10 of the automobile as mentioned, so that the shank 17 will extend rearwardly from the spring. The coupling member is adapted to be bolted to the thills of the vehicle and when it is desired to connect the vehicle to the automobile the ball-like head 24 is arranged in the recess or depression of the head 19 of the shank, the plate 21 having been previously removed. The plate is now fitted over the closed portion of the ball-like head and thus it will be seen that the head 19 and plate 21, with their corresponding recesses, form a socket for the ball-like head 24 whereby, when the plate 21 is bolted to the head 19 and the automobile is advanced over the ground, the vehicle connected with the automobile by the coupling member will readily follow and be drawn by the automobile and also will be steered or guided thereby due to the connection between the automobile and the vehicle, said ball-like head being freely movable in the socket formed by the head 19 and plate 21 so as to permit the vehicle to readily follow and be guided by the automobile in its progress over the road. Thus the autotmobile will be in the nature of a tractor or means for drawing another vehicle and by having the coupling described, it will be seen that this can be effectively accomplished, and that the coupling consists of few and simple parts which can be readily applied to the automobile and particularly to Ford cars, said coupling furthermore permitting of readily connecting the vehicle to the automobile and as easily uncoupling or disconnecting the same therefrom.

Having thus described my invention, I claim:

A coupler of the class described comprising in combination with a suitable support rectangular in cross section, a V-shaped member having its apex formed into a ball and apertured extremities, a plate carrying a socket at one end coöperating with said ball and having its remaining end portion shaped to have flat contact with the under surface of said support and flat contact with a portion of the side thereof, and further bent horizontally to form an apertured ear, a pair of U-bolts each straddling said support with one limb passing through said ear and the other passing through an intermediate portion of the plate so as to prevent movement of the plate away from the support, nuts for the bolts, a third bolt passing through said support and a nut threaded upon said third bolt and seated within said plate for preventing movement of the plate along the support.

In testimony whereof I affix my signature in presence of two witnesses.

JESSE E. POWELL.

Witnesses:
WILLIAM R. DARCEY,
M. M. MILLER.